US006647450B1

(12) United States Patent
Kaplinsky

(10) Patent No.: US 6,647,450 B1
(45) Date of Patent: Nov. 11, 2003

(54) MULTIPROCESSOR COMPUTER SYSTEMS WITH COMMAND FIFO BUFFER AT EACH TARGET DEVICE

(75) Inventor: Cecil H. Kaplinsky, deceased, late of Palo Alto, CA (US), by Vesselina Kaplinsky, executrix

(73) Assignee: Cradle Technologies, Inc., Mountain View, CA (US)

( * ) Notice: Subject to any disclaimer, the term of this patent is extended or adjusted under 35 U.S.C. 154(b) by 457 days.

(21) Appl. No.: 09/680,652

(22) Filed: Oct. 6, 2000

Related U.S. Application Data

(60) Provisional application No. 60/158,184, filed on Oct. 6, 1999.

(51) Int. Cl.[7] .......................... G06F 13/00; G06F 13/36
(52) U.S. Cl. ........................................ 710/300; 710/310
(58) Field of Search ................................ 710/300, 305, 710/306, 310

(56) References Cited

U.S. PATENT DOCUMENTS

| | | | |
|---|---|---|---|
| 5,041,968 A | 8/1991 | Yamaguchi | 364/200 |
| 5,197,130 A | 3/1993 | Chen et al. | 395/325 |
| 5,239,661 A | 8/1993 | Ando et al. | 395/800 |
| 5,371,711 A | 12/1994 | Nakayama | 361/230.03 |
| 5,440,701 A | 8/1995 | Matsuzaki et al. | 395/375 |
| 5,566,313 A | 10/1996 | Yamamura | 395/412 |
| 5,568,624 A | 10/1996 | Sites et al. | 395/375 |
| 5,632,029 A | 5/1997 | Bruce et al. | 395/500 |
| 5,634,003 A | 5/1997 | Saitoh et al. | 395/200.1 |
| 5,634,034 A | 5/1997 | Foster | 395/474 |
| 5,680,568 A | 10/1997 | Sakamura | 395/421.1 |
| 5,680,632 A | 10/1997 | Studor et al. | 395/800 |
| 5,685,004 A | 11/1997 | Bruce et al. | 395/800 |
| 5,732,223 A | 3/1998 | Moore et al. | 395/250 |
| 5,751,699 A | 5/1998 | Radke | 370/258 |
| 5,751,991 A | 5/1998 | Leach et al. | 395/421.04 |
| 5,758,195 A | 5/1998 | Balmer | 395/898 |
| 5,761,516 A | 6/1998 | Rostoker et al. | 395/733 |
| 5,778,197 A | 7/1998 | Dunham | 395/284 |
| 5,778,423 A | 7/1998 | Sites et al. | 711/118 |
| 5,787,081 A | 7/1998 | Bennett et al. | 370/388 |
| 5,949,981 A | 9/1999 | Childers | 395/309 |
| 5,996,036 A | 11/1999 | Kelly | 710/110 |
| 6,035,362 A | 3/2000 | Goodrum et al. | 710/128 |
| 6,055,598 A | 4/2000 | Lange | 710/129 |

Primary Examiner—Tim Vo
(74) Attorney, Agent, or Firm—Thomas Schneck

(57) ABSTRACT

A multiprocessor computer system in which each processor being used as a target device has a FIFO (first in first out) buffer for receiving and storing transfer commands from a split transactional global bus for later execution. The transfer commands are put in the FIFO of the target device in the order of their arrival and are taken out of the FIFO and executed by the target device in the same order. This eliminates the wasting of bus time that occurs when busy signals are sent from target devices to master devices and when transfer commands are resent from master devices to target devices. Therefore, the present invention eliminates the wasting of bus time related to transfer commands being rejected.

30 Claims, 3 Drawing Sheets

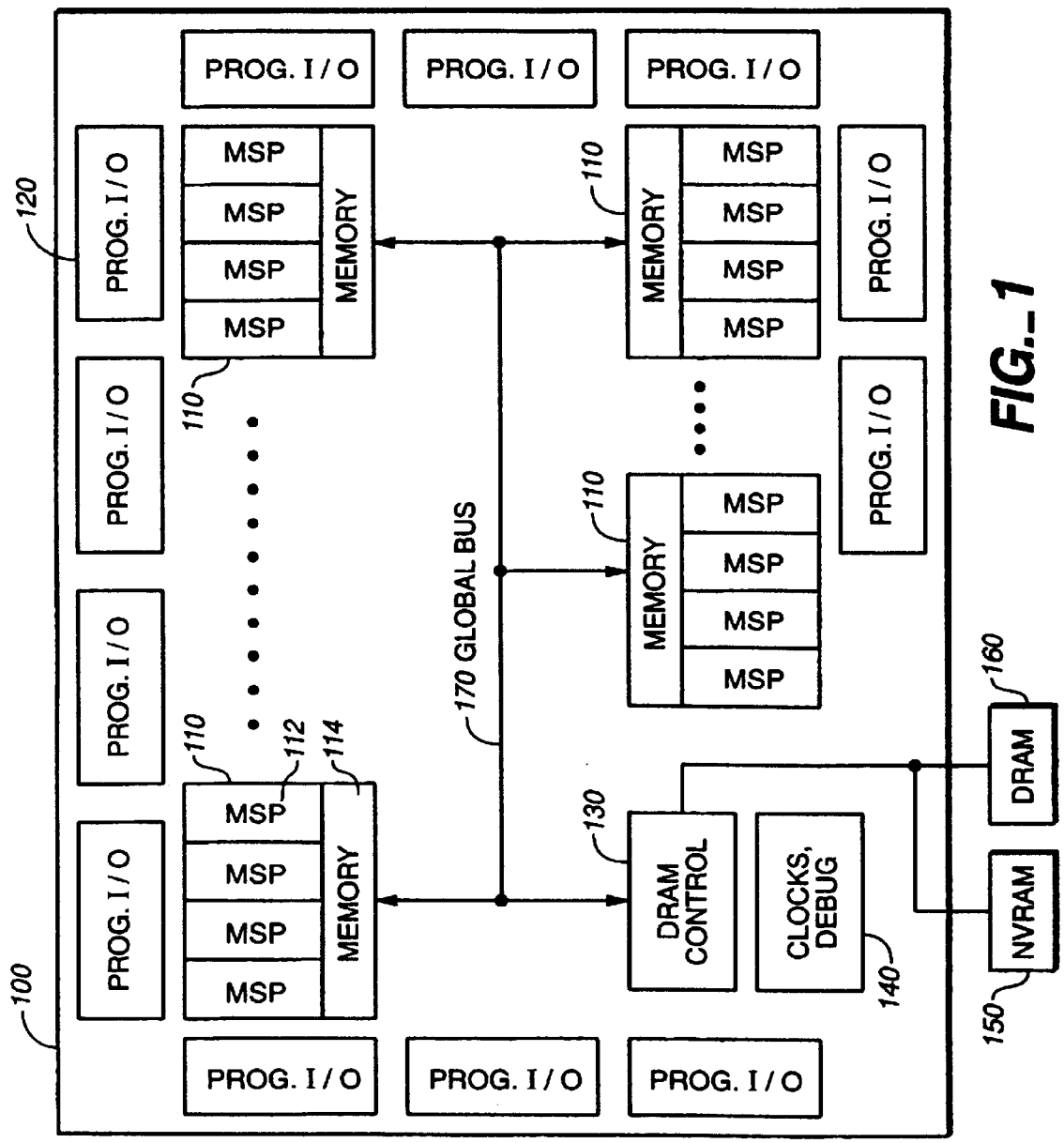
FIG._1

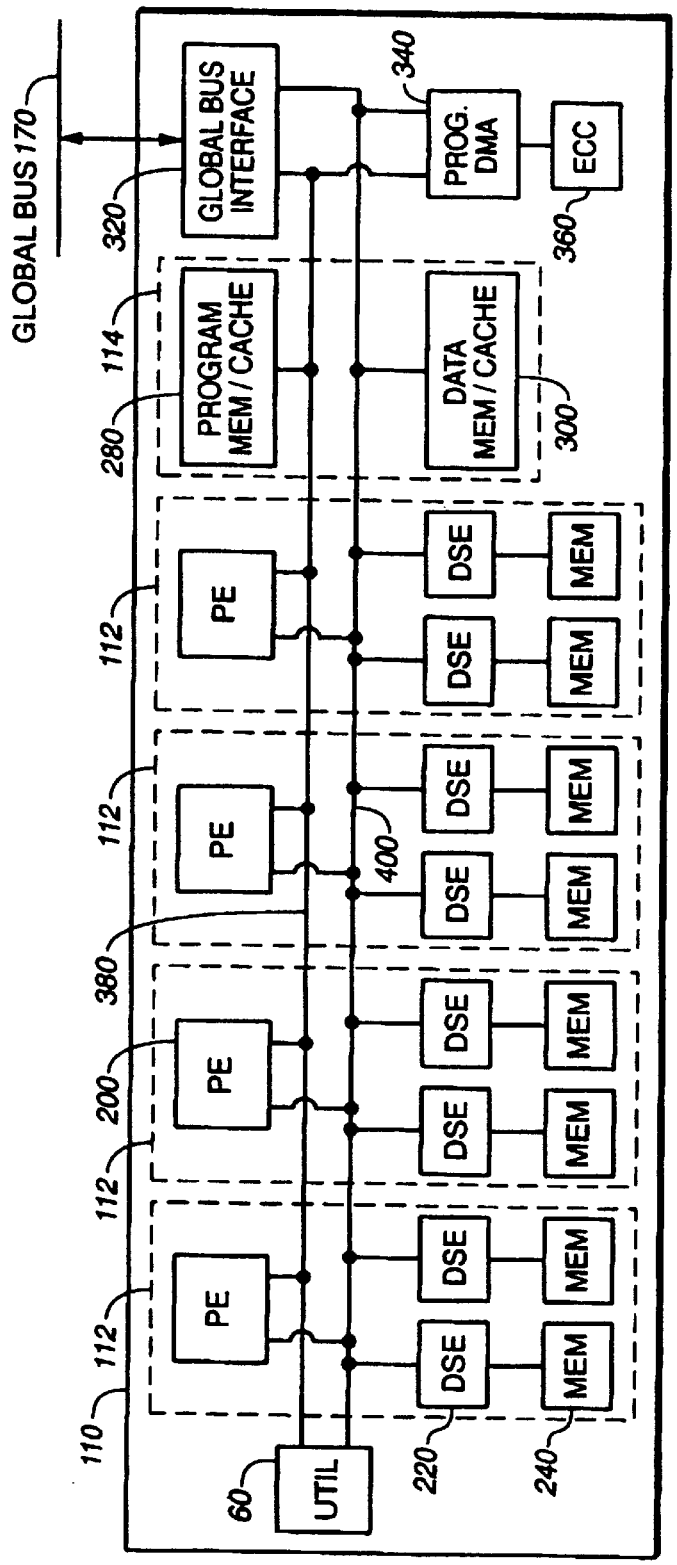
FIG._2
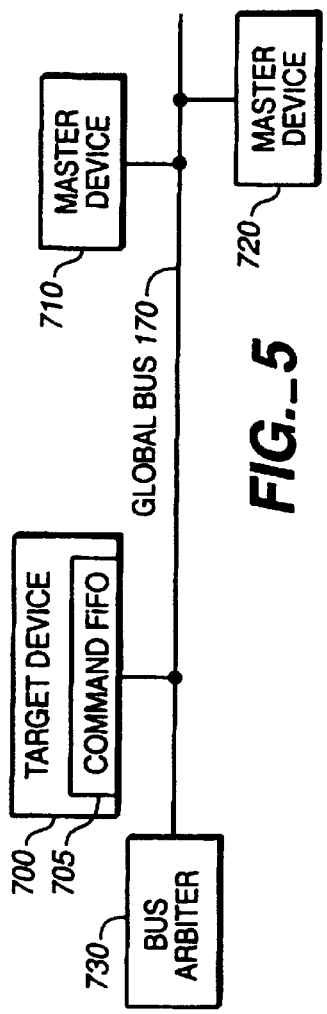
FIG._5

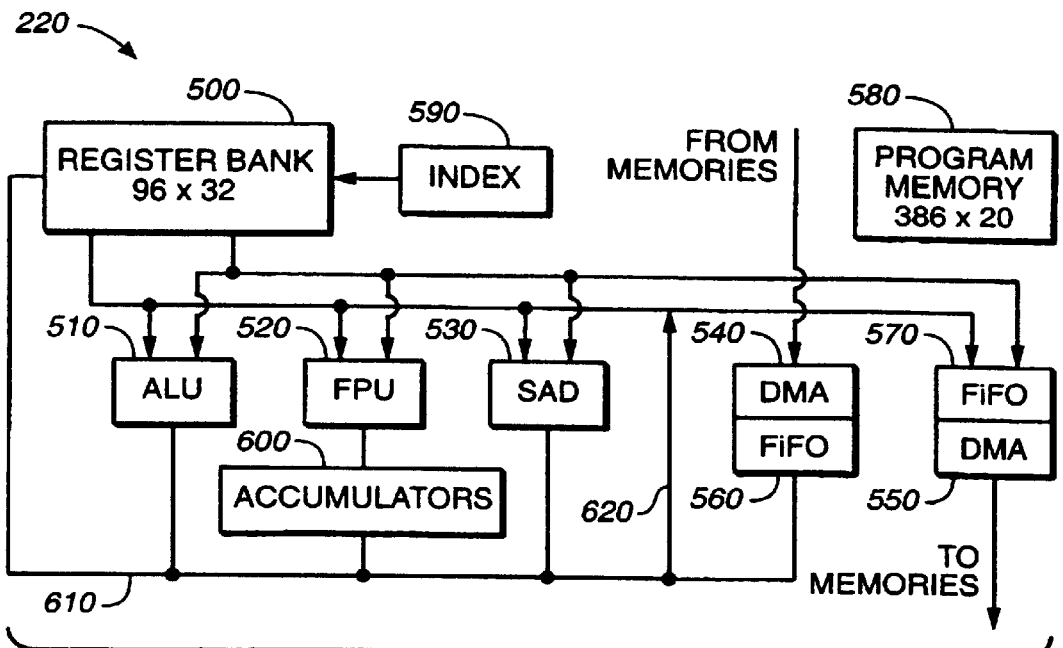
FIG._3
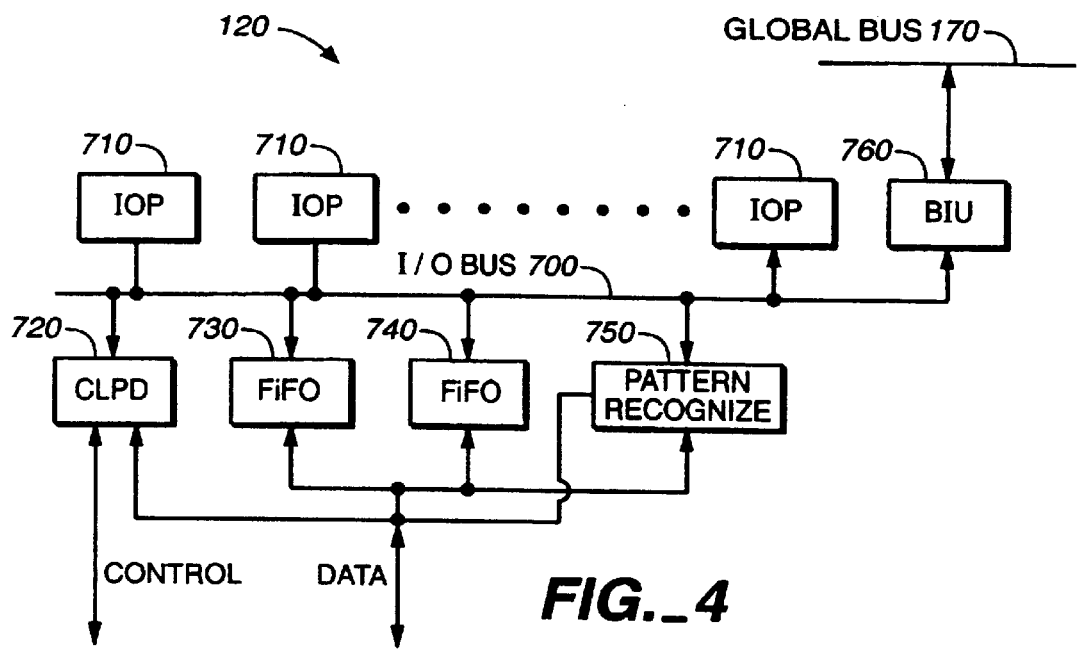
FIG._4

MULTIPROCESSOR COMPUTER SYSTEMS WITH COMMAND FIFO BUFFER AT EACH TARGET DEVICE

CROSS-REFERENCE TO RELATED APPLICATION

This application claims priority from U.S. provisional application No. 60/158,184, filed Oct. 6, 1999.

TECHNICAL FIELD

The present invention relates to multiprocessor computer systems, and more particularly to multiprocessor computer systems implementing techniques for reducing bus contingency issues.

BACKGROUND ART

In a computer system, a bus is the means by which the electrical signals are communicated back and forth between a central processor, memory, and other devices such as input and output adapters. In a uniprocessor computer system, the bus may simply be a plurality of electrical conductors linking the various components of the system. However, in multiprocessor and other more sophisticated computer systems, the bus may become more complex and play an active role in directing the various signals between the components of the computer system, usually for the purpose of obtaining greater data throughput or speed of operation.

One of the significant restrictions in the operation of a modern high speed computer is the memory access time of main memory. The memory access time is the time required for the memory to retrieve the information from its internal storage after it has received a read address signal. Since a high percentage of data processing activities in a computer system involves reading information from memory, the cumulative amount of memory access time involved in typical data processing activities can be significant. The cumulative effect of the waiting during access time periods is to reduce the data throughput of the computer system. In a uniprocessor computer system, this is not a problem because there is nearly nothing else which the system could be doing during the access time period. However, in multiprocessor systems, the other processors in the system could use the access time periods to conduct other activities through the bus, and thereby increase the efficiency of the system.

The bus that has the above-mentioned problems is called a single transaction bus. When a master device (e.g. processor) requests data from a target device (e.g. memory) through the bus, the bus is unavailable for use by any other devices until the requested data is returned to the requesting master device. This bus is called a single transaction bus because the entire transaction between two devices through the bus must complete before another transaction starts through the bus. Therefore, if the target device is slow in retrieving requested data, the bus is blocked and unused for a very long time.

This problem has been recognized and, as a result, split transaction buses have been devised. In a split transaction bus, the master device obtains bus use permit from a bus arbiter and sends a read command (a request for data) through the bus to the target device and then releases the bus for use by other devices. The target device, after receiving the read command, retrieves the requested data from its internal memory and then obtains bus use permit from the bus arbiter. After getting the permit, the target device sends the requested data to the requesting master device. This bus is called a split transaction bus because the transaction between the master and target devices is split in time into two transactions so that during the time in between the bus is free for use by other devices. Write transaction are still single transactions in this split transaction bus. In a write transaction, the master device sends a write command followed by write data through the bus to the target device. When the target device signals the receipt completion, the master device releases the bus.

This split transaction bus still has problems. If the target device receives a read command through the bus from a master device A and then, when it (target device) is busy retrieving the requested data from its internal memory, another transfer command (a read or a write command) comes to it through the bus from a second master device B, the target device must returns a busy signal so that master device B can resend the transfer command later. This causes the following problems. First, it costs bus time to send busy signals from the target device through the bus to master device B. This may occur more than once because at the next attempt by master device B, the target device may still be busy. Second, it also costs bus time to resend the transfer command from master device B through the bus to the target device. These two problems can be more significant when many master devices send transfer commands to the busy target device and all of them have to repeatedly resend their transfer commands. Third, the order of execution of transfer commands is not optimal, i.e. not first come first served.

Therefore, an object of the present invention is to provide a multiprocessor computer system in which there is no waste of bus time for sending busy signals from target devices to master devices.

Another object of the present invention is to provide a multiprocessor computer system in which there is no waste of bus time for resending transfer commands from master devices to target devices.

Yet another object of the present invention is to provide a multiprocessor computer system in which the transfer commands from master devices to a target device are executed by the target device in a first come first serve order.

DISCLOSURE OF THE INVENTION

The present invention achieves the stated objects by providing a FIFO (first in first out) buffer for each target device in the multiprocessor computer system. Transfer commands from master devices through the bus to a target device will be put in the FIFO of the target device in the order of their arrival. The transfer command will be taken out of the FIFO and be executed by the target device in the same order. Write transactions are still single transactions, i.e. in a write transaction, the write command and write data both are sent from the master device through the bus and put in the FIFO of the target device. The target device will take the write command and write data from the FIFO and execute the write command. In a read transaction, the read command is sent from the master device through the bus to the FIFO of the target device. Later, this read command is taken out from the FIFO and executed by the target device, and requested data is sent from the target device through the bus to the requesting master device. If the FIFO is sufficiently deep, all incoming transfer commands will be put in the FIFO for later execution by the target device. Therefore, there is no waste of bus time related to transfer commands being rejected.

BRIEF DESCRIPTION OF THE DRAWINGS

FIG. 1 shows a schematic block diagram of a processing system in accord with the present invention.

FIG. 2 shows a schematic block diagram of one of the four quads used in the processing system of FIG. 1.

FIG. 3, shows a schematic block diagram of the Digital Signal Engine used in FIG. 1.

FIG. 4, shows the internal structure of the programmable I/O logic of FIG. 1.

FIG. 5, shows a schematic block diagram illustrating the use of a command FIFO in a target bus device according to the present invention.

BEST MODE FOR CARRYING OUT THE INVENTION

With reference to FIG. 1, Universal Microsystem 100 of the present invention has, for illustrative purposes, four quads 110, a plurality of programmable Input/Output interfaces 120, Dynamic Random Access Memory (DRAM) controller 130, Clock Debug 140, Nonvolatile Random Access Memory (NVRAM) 150, Dynamic Random Access Memory (DRAM) 160, and Global Bus 170.

Universal Microsystem 100 of the present invention has its function defined by software, its Input/Outputs defined by software, mix and match non-blocking I/P (internet protocol). In Universal Microsystem 100, coarse-grain parallelism is the key; and there is no need for parallelizing compiler. Moreover, memory bandwidth scales with processing power. The processing, software, and I/O are all scalable. Each application in Universal Microsystem 100 runs on its own pool of processors. Each quad 110 has, for illustrative purpose, four Media Signal Processors (MSP) 112 and quad memory 114. Each quad 110 is coupled to Global Bus 170. The internal structure of each quad 110 will be described later. Each Input/Output interface 120 of Universal Microsystem 100 can be programmed to interface with an Intel (Universal Serial Bus), an IEEE 1394 FireWire bus, a PCI bus, a SCSI bus, a MAC interface, I2C bus, or other customized interfaces. Peripherals connected to Input/Output interfaces 120 are independent; and there is not mutual interference among them. DRAM controller 130 is coupled to NVRAM 150, DRAM 160, and Global Bus 170.

With reference to FIG. 2, a more detailed view of a quad 110 includes four Media Signal Processors (MSD) 112, quad memory 114, Global Bus interface 320, Programmable Direct Memory Access (DMA) 340, Utility 260, ECC 360, instruction bus 380, and data bus 400. Each MSD 112 includes, for illustrative purposes, a RISC Processing Engine (PE) 200, two Digital Signal Engines (DSE) 220 used for inner loops, and two MSD memory memories 240. PE 200 is coupled to instruction bus 380 and data bus 400. Each DSE 220 is coupled to data bus 300 and MSD memory 240. Quad memory 114 includes program memory/cache 280 and data memory/cache 300, which are coupled to instruction bus 380 and data bus 400, respectively. Program memory/cache 280 is 64 bits wide and runs at higher than 320 MHz (4×PE) and can be configured as cache and/or scratchpad. The Pes 200 use less than 35% of the memory bandwidth. Memory bandwidth scales with processing power. Global Bus interface 320 couples instruction bus 380 and data bus 400 to Global Bus 170. Programmable DMA 340 is coupled to instruction bus 380, data bus 400, and ECC 360. Utility Unit 260 is coupled to instruction bus 380 and data bus 400 and performs utility functions. Each PE 200 has RISC-like instruction set, 32-bit integer and IEEE floating point units, multiple addressing modes (indexed, increment/decrement, 8, 16, 32, and 64 bit), 32 registers, 16-bit instructions, shared data and program memory.

With reference to FIG. 3, each DSE 220 includes Register Bank 500, integer Arithmatic Logic Unit (ALU) 510, Floating Point Unit (FPU) 520, a plurality of Accumulators 600, Sum of Absolute Differences unit 530, input DMA 540, output DMA 550, input FIFO 560, output FIFO 570, a plurality of index registers 590, and programmable memory 580. Index registers 590 are coupled to Register Bank 500 and hold the addresses of data stored in Register Bank 500. ALU 510, Accumulators 600, SAD 530, DMA 540, and FIFO 570 are all coupled to and receive data input from Register Bank 500. ALU 510, Accumulators 600, SAD 503, and FIFO 560 can use path 610 to load data to Register Bank 500. FIFO 560 can use path 620 to load data from external memories to other components of DSE 220. Program memory 580 stores the instructions, floating point and integer units 520, DMAs 540, 550 to other memories, 96 registers 500, and floating point MAC (Multiply Accumulate) instructions. Each DSE 220 also has 324 MHz clock, 2 and 3 operand instructions, 1 CPI, memory bandwidth provided by local memories, IEEE floating point and integer operands, floating point operations being dispatched once per clock with capability of performing multiple operations some special instructions, field access, SAD (sum of absolute differences).

With reference to FIG. 4, the programmable Input/Output interface 120 includes Input/Output processors (IOP) 710, Complex Programmable Logic Device (CPLD) 720, FIFOs 730 and 740, Pattern Recognizer 750, Bus Interface Unit (BIU) 760, and Input/Output Bus 700. Each Programmable Input/Output interfaces 120 has an independent peripheral (there is no mutual interference among peripherals), clock rate up to 125 MHz, total data rate greater than 1 Gbyte/sec, 2.5 Gips of processing power. CPLD 720 is coupled to I/O Bus 700 and generates control signals. FIFOs 730 and 740 buffer data. Input/Output processors (IOP) 710 are coupled to I/O Bus 700 and perform additional processing and set-up. Pattern Recognizer 750 is coupled to I/O Bus 700, FIFOs 730, 740, and CPLD 720. Pattern Recognizer 750 is controlled by CPLD 720. BIU 760 couples I/O Bus 700 and Global Bus 170.

With reference to FIG. 5, function of command FIFO 705 can be described in an illustrating case as follow. Master device 710 gets a bus use permit from bus arbiter 730 and sends a first read command through Global Bus 170 to target device 700. The first red command is put in command FIFO 705 to be executed by target device 700. Target device 700 sends back to master device 710 an acknowledgment of command receipt. Upon receiving this acknowledgment, master device 710 releases Global Bus 170 for use by other bus devices. Right after that, assuming, another master device 720 gets a bus use permit from bus arbiter 730 and sends a second transfer command (read and write commands) through Global Bus 170 to target device 700. The second transfer command is put in command FIFO 705 to be executed by target device 700 after the execution of the first read command. Target device 700 sends back to master device 700 an acknowledgment of command receipt. Upon receiving this acknowledgment, master device 720 releases Global Bus 170 for use by other bus devices. When target device 700 retrieves requested data from its internal memory in response to the first read command, it gets a bus use permit from bus arbiter 730 and sends the requested data through Global Bus 170 to master device 710. After that, target device 700 executes the second transfer command in a similar manner.

Each master device in the system can have only one outstanding transaction, meaning when a master device sends a transfer command and gets an acknowledgment, it cannot send another transfer command until it receives the acknowledgment that the transaction is complete. Therefore, if command FIFO 705 is sufficiently deep to accommodate all possible transfer commands from all master devices in the system, there will be no command rejection. If for some reason, command FIFO 705 is full, the next incoming transfer command will be rejected and a busy signal is sent to master device that sent the command so that it can resend the command at a later time.

Write transactions are still single transactions, i.e. in a write transaction, the write command and write data both are sent from the master device through global bus 170 and put in the FIFO 705. Target device 700 will take the write command and write data from the FIFO 705, execute the write command, and send an acknowledgment that write transaction is complete. Upon receipt of this acknowledgment, the master device can send another transfer command to target device 700.

Without any command rejection, there is no waste of bus time related to sending busy signals, repeated resending of transfer commands. In addition, commands in command FIFO will be executed in first come first served order.

What is claimed is:

1. A multiprocessor computer system comprising:
   a) a split transaction global bus;
   b) at least one target device connected to the split transaction global bus, the at least one target device having a command FIFO buffer for storing a command issued by the split transaction global bus to the target device such that the at least one target device may accept the issued command both while it is executing a previously-issued command and while it is not executing any command; and
   c) a plurality of master devices connected to the split transaction global bus and having means for releasing the split transaction global bus for use by another device connected to the split transaction global bus after receiving an acknowledgment of command receipt from the at least one target device.

2. The multiprocessor computer system of claim 1 further comprising the at least one target device having means for issuing an acknowledgment of command receipt to the master device issuing a command.

3. The multiprocessor computer system of claim 1 further comprising a global interface unit intermediating between the split transaction global bus and any device communicating with the split transaction global bus.

4. The multiprocessor computer system of claim 1 wherein a first master device using the split transaction global bus does not block a second master device using the split transaction global bus.

5. The multiprocessor computer system of claim 1 wherein each master device can only have one outstanding transaction.

6. The multiprocessor computer system of claim 1 wherein each command stored in the command FIFO buffers is executed in a first come first served order.

7. The multiprocessor computer system of claim 1 further comprising a bus arbiter connected to the global bus, the bus arbiter determining which of the devices connected to the split transaction global bus may access the split transaction global bus.

8. The multiprocessor computer system of claim 1 wherein the master device includes a plurality of media signal processors.

9. The multiprocessor computer system of claim 1 wherein the master device includes a memory.

10. The multiprocessor computer system of claim 1 wherein the master device includes a global bus interface.

11. The multiprocessor computer system of claim 1 wherein each digital signal engine is connected to a data bus.

12. The multiprocessor computer system of claim 1 wherein the global bus interface couples an instruction bus and a data bus.

13. The multiprocessor computer system of claim 1 wherein the master device is an input/output interface.

14. The multiprocessor computer system of claim 1 wherein the target device is a DRAM controller.

15. The multiprocessor computer system of claim 1 further comprising the target device having means for sending an acknowledgment of a completed write transaction to the requesting master device.

16. The multiprocessor system of claim 1 wherein each command FIFO buffer is of a size large enough to accommodate all possible transfer commands from all master devices in the system.

17. The multiprocessor computer system of claim 2 further comprising the at least one target device having means for sending requested data to the master device issuing a command.

18. The multiprocessor computer system of claim 8 wherein each of the plurality of media signal processors includes a processing engine.

19. The multiprocessor computer system of claim 8 wherein each of the plurality of media signal processors includes at least one digital signal engine.

20. The multiprocessor computer system of claim 8 wherein each of the plurality of media signal processor includes at least one media signal processor memory.

21. The multiprocessor computer system of claim 18 wherein each processing engine is connected to an instruction bus and a data bus.

22. A method of preventing a bus in a multiprocessor computer system from being blocked comprising:
   a) sending a command from a master device to a split transaction global bus;
   b) placing the command in a command FIFO of a target device;
   c) sending the master device an acknowledgement of command receipt;
   d) releasing the split transaction global bus for use by other bus devices, where such use includes another master device issuing a command accepted by the target device while the target device is executing a previously-issued transaction; and
   e) repeating steps a)–d) as necessary.

23. The method of claim 22 further comprising obtaining a bus use permit from a bus arbiter to send a command to the split transaction global bus.

24. The method of claim 22 wherein the command is a read command.

25. The method of claim 22 wherein the command is a write command.

26. The method of claim 22 further comprising executing commands stored in a command FIFO on a first come first served basis.

27. The method of claim 24 further comprising retrieving requested data.

28. The method of claim 25 further comprising executing the write command.

29. The method of claim 27 further comprising sending the requested data to the master device through the split transaction global bus.

30. The method of claim 28 further comprising sending an acknowledgment of completion of the write command.

* * * * *